(12) United States Patent
Chabot

(10) Patent No.: US 11,688,315 B2
(45) Date of Patent: Jun. 27, 2023

(54) METHOD FOR MONITORING THE EXECUTION OF A GRAPHICAL CALCULATION AND DISPLAY CHAIN ASSOCIATED WITH AN AIRCRAFT COCKPIT DISPLAY SCREEN

(71) Applicant: THALES, Courbevoie (FR)

(72) Inventor: Philippe Chabot, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/571,126

(22) Filed: Jan. 7, 2022

(65) Prior Publication Data
US 2022/0223078 A1    Jul. 14, 2022

(30) Foreign Application Priority Data

Jan. 8, 2021 (FR) ...................... 21 00154

(51) Int. Cl.
G09G 3/00 (2006.01)
B64D 43/00 (2006.01)
G06T 1/20 (2006.01)

(52) U.S. Cl.
CPC ............. *G09G 3/006* (2013.01); *B64D 43/00* (2013.01); *G06T 1/20* (2013.01); *G09G 2330/021* (2013.01); *G09G 2380/12* (2013.01)

(58) Field of Classification Search
CPC ........... G09G 3/006; B64D 43/00; G06T 1/20
USPC .......................... 345/522; 701/533
See application file for complete search history.

(56) References Cited

U.S. PATENT DOCUMENTS

| 7,724,260 B2 | 5/2010 | Hancock et al. |
| 9,892,479 B1* | 2/2018 | Pruitt ................... G06T 1/20 |
| 2007/0046670 A1* | 3/2007 | Hedrick ............. G01C 23/00 |
| | | 345/440 |
| 2016/0103579 A1* | 4/2016 | Coulmeau .......... G06F 3/04842 |
| | | 701/533 |

(Continued)

FOREIGN PATENT DOCUMENTS

DE    10229342 A1    1/2004

OTHER PUBLICATIONS

Kirschbaum Axel Graphics data-processing device for a screen in a car, e.g. for a tachometer, has an image data memory and a graphics controller Jan. 29, 2004 BOSCH GMBH Robert English App. # DE20021029342 paragraphs 11, 23, 52, Claim 7.*

(Continued)

*Primary Examiner* — Prabodh M Dharia
(74) *Attorney, Agent, or Firm* — ArentFox Schiff LLP

(57) ABSTRACT

The invention relates to this method comprising the following steps, for at least one input/output parameter:
  duplicating and inserting a list of graphical commands associated with said parameter within a calculation module of said chain,
  from a current value of said parameter, obtaining a current cyclic redundancy code associated with a current micropattern, generated by executing said at least one list,
  comparing said current cyclic redundancy code with a reference cyclic redundancy code stored in a dedicated memory space for a substantially identical value of said parameter within a tolerance threshold,
  in the event of a difference in cyclic redundancy code value, automatic sanctioning of said chain at least by suspending its execution.

10 Claims, 5 Drawing Sheets

(56) References Cited

U.S. PATENT DOCUMENTS

2017/0083206 A1\* 3/2017 He .................. G08G 5/0021
2019/0286115 A1 9/2019 Wang

OTHER PUBLICATIONS

Kirschbaum Axel Graphics data-processing device for a screen in a car, e.g. for a tachometer, has an image data memory and a graphics controller Jan. 29, 2004 BOSCH GMBH Robert Deutsch App. # DE20021029342 paragraphs 11, 23, 52, Claim 7.\*

French Search Report, from the French Patent Office in counterpart French Application No. 2100154, dated Sep. 28, 2021.

\* cited by examiner

METHOD FOR MONITORING THE EXECUTION OF A GRAPHICAL CALCULATION AND DISPLAY CHAIN ASSOCIATED WITH AN AIRCRAFT COCKPIT DISPLAY SCREEN

CROSS REFERENCE TO ASSOCIATED APPLICATIONS

This application is a non-provisional U.S. application claiming the benefit of French application No. 21 00154, filed on Jan. 8, 2021, which by reference is incorporated herein in its entirety.

FIELD

The present invention relates to a method for monitoring the execution of a first graphical calculation and display chain associated with a first aircraft cockpit display screen, the aircraft cockpit comprising a plurality of distinct display screens, each associated with a graphical calculation and display chain, each graphical calculation and display chain comprising:
  an acquisition module configured to acquire and calculate a plurality of input/output parameters of said first graphical calculation chain,
  a calculation module configured to determine at least one list of graphical commands, for each parameter of said plurality, able to generate an associated symbology to be represented;
  a graphical module configured to generate an image comprising the symbology associated with each parameter from said at least one list of graphical commands respectively associated with each parameter of said plurality;
  a display module configured to display said image comprising the symbology associated with each parameter, on the display screen associated with said graphical calculation and display chain.

The present invention also relates to a non-transitory computer-readable medium including a computer program having software instructions that implement this monitoring method when executed by a computer.

The present invention also relates to an electronic device for monitoring the execution of a first graphical calculation and display chain associated with a first aircraft cockpit display screen, the aircraft cockpit comprising a plurality of separate display screens, each associated with its own graphical calculation and display chain.

The present invention also relates to avionics equipment comprising said first graphical calculation chain and this electronic monitoring device.

The present invention also relates to an aircraft comprising this electronic monitoring device or avionics equipment. Hereinafter, aircraft means piloted aircraft such as airplanes and helicopters, but also remotely operated aircraft such as drones.

The present invention relates generally to the field of graphical calculators and visualization avionics onboard an aircraft cockpit that require integrity compatible with flight safety.

BACKGROUND

As known, graphical calculators and visualizations in aircraft cockpits must ensure a high integrity of the flight parameters used by the pilots. Indeed, a display error in the critical parameters used for piloting (attitudes, speed, altitude, etc.) or for monitoring avionic systems (engine(s), fuel level, hydraulic elements, etc.), could have a catastrophic effect.

A current solution is based on the principle of monitoring the cockpit visualization display, provided by a graphical calculation and display chain, by another independent calculation chain, known as monitoring, involving low latency (or delay) exchanges through the avionics communication network or dedicated communication network(s). In order to avoid the comparison thresholds being too high and therefore of no relevance to flight safety, it is necessary to guarantee extremely low latencies (delays), of the order of a few tens of milliseconds.

However, with this solution based on a complete redundant monitoring calculation of the graphical calculation and display chain to be monitored, in case of detection of a difference between the graphical calculation and display chain to be monitored and the monitoring chain, it is not possible to identify the chain in question. As a result, the sanctioning reverts to the crew via a message provided, requiring crew verification and consequently an additional workload to compare the flight data displayed by the graphical calculation and display chain to be monitored with a backup instrument.

SUMMARY

The object of the invention is then to propose a solution to this problem by avoiding the need for crew intervention while locating and sanctioning any display malfunction automatically (i.e. without human intervention).

To this end, the object of the invention is a method for monitoring the execution of a first graphical calculation and display chain associated with a first aircraft cockpit display screen, the aircraft cockpit comprising a plurality of distinct display screens, each associated with a graphical calculation and display chain, each graphical calculation and display chain comprising at least:
  one acquisition module configured to acquire and calculate a plurality of input/output parameters of said first graphical calculation chain,
  one calculation module configured to determine at least one list of graphical commands for each parameter of said plurality, able to generate an associated symbology to be represented,
  one graphical module configured to generate an image comprising the symbology associated with each parameter from said at least one list of graphical commands associated with each respective parameter of said plurality,
  one display module configured to display said image comprising the symbology associated with each parameter, on the display screen associated with said graphical calculation and display chain,
  the method being implemented by an electronic monitoring device associated locally with said first graphical calculation and display chain, the method comprising the following steps, for at least one parameter of said plurality:
  duplicating and inserting said at least one list of graphical commands associated with said parameter within said calculation module,
  from a current and dynamic value of said parameter, obtaining a current cyclic redundancy code associated with a current micropattern, generated by executing said at least one duplicated list of graphical commands associated with said parameter, comparing said current cyclic redundancy code associated with the current micropattern with a reference cyclic redundancy code associated with a reference micropattern obtained and stored beforehand in a dedicated memory space within the said electronic monitoring device, for a substantially identical value of said parameter, to within a tolerance threshold specific to the said parameter in the event of a difference in the cyclic redundancy code value, between the said current cyclic redundancy code associated with a current micropattern and the said reference cyclic redundancy code associated with a reference micropattern, automatic sanctioning of the said first graphical calculation and display chain by implementing at least one suspension of its execution.

According to other advantageous aspects of the invention, the monitoring method comprises one or more of the following features, taken alone or in any technically possible combination:

said current micropattern is configured to be displayed in an area of the first screen not visible to said aircraft pilot;

for said at least one parameter of said plurality the method further comprises, beforehand:

receiving the current and dynamic value of said parameter received by the acquisition module of said first graphical calculation chain directly from a sensor belonging to a plurality of said aircraft sensors, receiving at least one cyclic redundancy code encapsulating a said parameter value, received and then transmitted to said electronic monitoring device by said acquisition module of said first graphical calculation and display chain, coming from a graphical calculation and display chain associated with a display screen of said aircraft cockpit, distinct from the said first display screen, and verifying said current and dynamic value of said parameter by determining the difference between:

the current and dynamic value of said parameter received by the acquisition module of said first graphical calculation chain, directly from a sensor belonging to a plurality of sensors of said aircraft, and at least one associated value of said parameter, respectively determined from said at least one cyclic redundancy code, encapsulating a said parameter value;

in the event of a difference greater than a first predetermined parameter threshold value resulting from said difference determination, automatic sanctioning of said first graphical calculation and display chain by implementing at least one suspension of its execution.

the verification implements a vote when at least two cyclic redundancy codes encapsulating the same parameter value are received substantially simultaneously from at least two distinct graphical calculation and display chains respectively associated with at least two distinct display screen of said aircraft cockpit and distinct from said first display screen;

the method further comprises:

receiving the value of said parameter determined for display by the calculation module of said first graphical calculation chain from the current and dynamic value of said parameter, received by the acquisition module of said first graphical calculation chain, comparing the value of said parameter determined for display and the current and dynamic value of said parameter, received by the acquisition module of said first graphical calculation chain, coming directly from a sensor belonging to a plurality of sensors of said aircraft, and, in the event of a difference greater than a second predetermined parameter threshold value, automatic sanctioning of said first graphical calculation and display chain by implementing at least one suspension of its execution, the method further comprises a step, prior to obtaining a current cyclic redundancy code associated with a current micropattern generated by execution of said at least one duplicated list of graphical commands associated with said at least one parameter, of determining an approximate reference value of the current and dynamic value of said at least one parameter, based on said tolerance threshold specific to said at least one parameter.

The object of the invention is also a non-transitory computer-readable medium including a computer program comprising software instructions that implement this monitoring method when executed by a computer.

Another object of the invention is an electronic device for monitoring the execution of a first graphical and display calculation chain associated with a first aircraft cockpit display screen, the aircraft cockpit comprising a plurality of distinct display screens, each associated with a graphical and display calculation chain, each graphical and display calculation chain comprising:

an acquisition module configured to acquire and calculate a plurality of input/output parameters of said first graphical calculation chain, a calculation module configured to determine at least one list of graphical commands for each said plurality parameter, able to generate an associated symbology to be represented, a graphical module configured to generate an image comprising the symbology associated with each parameter from said at least one list of graphical commands associated with each respective plurality parameter, a display module configured to display said image comprising the symbology associated with each parameter, on the display screen associated with said graphical calculation and display chain, the electronic monitoring device being locally associated with said first graphical calculation and display chain and configured, for at least one plurality parameter:

to duplicate and insert said at least one list of graphical commands associated with said parameter within said calculation module, to obtain a current cyclic redundancy code associated with a current micropattern. generated by execution of said at least one duplicated list of graphical commands associated with said parameter, from a current and dynamic value of said parameter, to compare said current cyclic redundancy code associated with the current micropattern with a reference cyclic redundancy code associated with a reference micropattern obtained and stored beforehand in a dedicated memory space within said electronic monitoring device, for a substantially identical value of said parameter, to within a tolerance threshold specific to said parameter, in the event of a cyclic redundancy code difference, between said current cyclic redundancy code associated with a current micropattern and said reference cyclic redundancy code associated with a reference micropattern, to automatically sanction said first graphical calculation and display chain by implementing at least one suspension of its execution.

Another object of the invention is aircraft avionics equipment comprising:
- a first graphical and display calculation chain associated with a first aircraft cockpit display screen, the aircraft cockpit comprising a plurality of distinct display screens, each associated with a graphical and display calculation chain, each graphical and display calculation chain comprising:
- an acquisition module configured to acquire and calculate a plurality of input/output parameters of said first graphical calculation chain,
- a calculation module configured to determine at least one list of graphical commands for each plurality parameter, able to generate an associated symbology to be represented,
- a graphical module configured to generate an image comprising the symbology associated with each parameter from said at least one list of graphical commands associated with each respective parameter of said plurality,
- a display module configured to display said image comprising the symbology associated with each parameter, on the display screen associated with said graphical and display calculation chain, and
- a device for monitoring the execution of said first graphical calculation and display chain according to the present invention, as specified.

The invention also relates to an aircraft comprising an electronic monitoring device according to the present invention as specified, or comprising avionics equipment according to the present invention as specified.

BRIEF DESCRIPTION OF THE DRAWINGS

These features and advantages of the invention will become clearer upon reading the following description, given only as a non-limiting example, and made with reference to the appended drawings, in which.

DETAILED DESCRIPTION

In this description, unless otherwise specified, the terms "substantially," "about," "approximately," and "on the order of" define an equal relationship, to within plus or minus 10%, preferably within plus or minus 5%.

Figure 1:
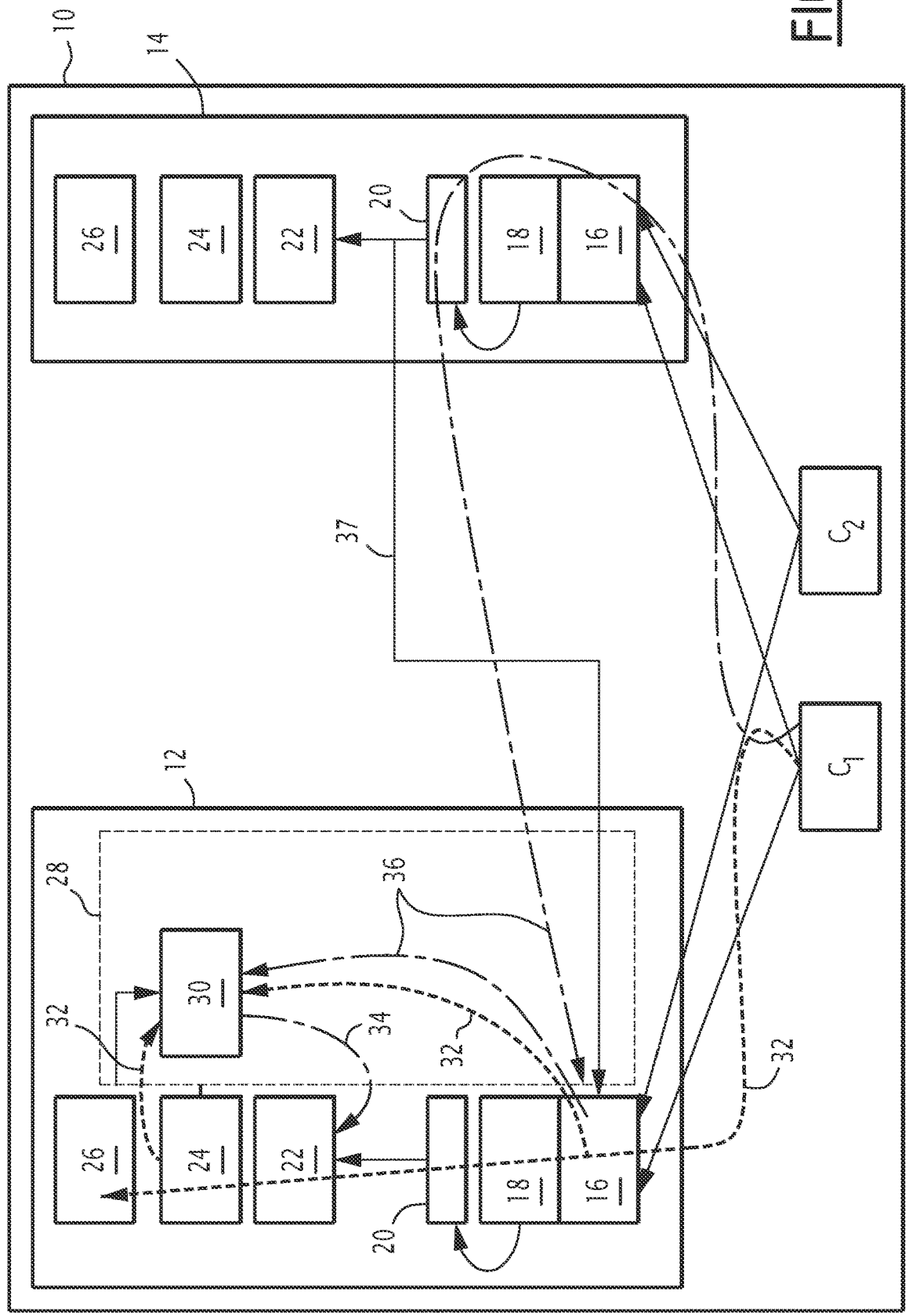
FIG. 1 is a schematic representation of the system architecture of the avionic equipment according to the present invention.

In the example in FIG. 1, an avionics assembly 10 of an aircraft cockpit is shown. This avionics assembly 10 comprises at least two screens. Each screen is associated with a graphical calculation and display chain. In FIG. 1, each graphical calculation and display chain is shown within each avionics display equipment, 12 and 14.

Each graphical calculation and display chain classically comprises, first, an acquisition module 16 configured to acquire a plurality of input/output parameters of the said first graphical calculation chain, with these parameters supplied by a plurality of avionic sensors such as the sensors C1 and C2, for example, capable of supplying a parameter P1 for the sensor C1 and a parameter P2 for the sensor C2, respectively.

Moreover, classically, each graphical calculation and display chain comprises a processing module 18 at the output of the acquisition module 16, configured to determine input/output data from the acquired parameters, and a validation module 20 at the output of the processing module 18, for the input/output data determined by the processing module 18, so that the input/output data at the output of the validation module 20 has a criticality level in accordance with the Development Assurance Level (DAL) A criticality level, representing the fact that a defect in the set formed by the modules 16, 18 and 20 could cause an issue of data misinterpretation by the crew, compromising flight safety and leading to a hazardous or even catastrophic effect if it were simultaneous on at least two cockpit stations (i.e. pilot and co-pilot).

Furthermore, each graphical calculation and display chain also classically comprises a calculation module 22 at the output of the validation module 20, configured to determine at least one list of graphical commands for each parameter of said plurality, able to generate an associated symbology to be shown, then a graphical module 24 configured to generate an image (i.e. determining at least one list of graphical commands for each parameter of said plurality, able to generate an associated symbology to be represented, then a graphical module 24 configured to generate an image (i.e. to draw the image) comprising the symbology associated with each parameter, from said at least one list of graphical commands associated with each respective parameter of said plurality, and finally a display module 26 (i.e. a screen and its associated lighting system such as a liquid crystal display (LCD)) configured to display said image comprising the symbology associated with each parameter on the display screen associated with said graphical calculation and display chain.

In particular, the image displayed by the display module 26 has at least a Development Assurance Level (DAL) B criticality level, representing the fact that a defect in the set formed by the modules 22, 24 and 26 could cause an issue of data misinterpretation by one of the pilots, leading to a hazardous effect (HAZ) that could cause serious damage to the aircraft.

It is to be noted that in the example of FIG. 1, the avionic display equipment shown, 12 and 14, are both able to implement the graphical generation obtained via the calculation module 22 and the graphical module 24 and the display via the display module 26 (i.e. a screen). In other words, the graphical generation and the display are united within the same equipment, thus presenting a system architecture commonly known as SMART.

In a variant to which the present invention is also applicable, according to a system architecture commonly referred to as DUMB, the graphical generation and the display are separate and in distinct and independent entities, namely graphical calculators on the one hand (formed of the above modules 16, 18, 20, 22, 24) and separate display module screens 26 on the other hand, with the independent graphical calculators transmitting the images by video channels to the screens.

According to the present invention, the avionics display equipment 12 further benefits locally from a unit 28, distinct from the graphical calculation and display chain formed by the above modules 16, 18, 20, 22, 24, 26.

This unit 28, physically independent of the graphical calculation and display chain formed by the above modules 16, 18, 20, 22, 24, 26 while being integrated within the avionics display equipment 12, comprises an electronic monitoring device 30 in particular, detailed below in connection with FIGS. 2 and 3.

In particular, this device 30 comprises a microprocessor not shown in FIG. 1, a memory not shown in FIG. 1, and interfaces not shown in FIG. 1, to retrieve the critical parameters 32, data 32 as processed by the graphical calculation and display chain formed by the above modules 16, 18, 20, 22, 24, 26, and, in particular, output data 32 from the graphical generation implemented by the graphical module 24, and to make a monitoring calculation as detailed below in connection with FIGS. 2, 3 and 5.

In particular and as described below in relation to FIGS. 2 and 3, this device 30 is able to generate at least one sanction 34 in case of error detection and stop the primary graphical calculation chain, which does not require any pilot intervention and results in the momentary or permanent loss of the primary graphical calculation chain for a single display channel, namely that of the avionics display equipment 12.

More precisely, when an error is detected locally by the monitoring device 30, the monitoring device 30 is configured to order the calculation module 22 to restart, according to the arrow 34 of FIG. 1 representing the sanction generated, after having restarted its memory (failure which can be linked to a single event upset (SEU). Advantageously, in this case, the loss is momentary (about 2 s).

If the error is still present after this restart, in particular according to the impact on flight safety, the monitoring device 30 is then configured to shut down the avionics display equipment 12 completely until the next power supply stop/start, which is equivalent to a forced shutdown initiated by the electronic monitoring device 30 until restart by human intervention.

Furthermore, when it identifies a failure within the graphical calculation and display chain formed by the above modules 16, 18, 20, 22, 24, 26 of the avionics display equipment 12, the monitoring device 30 is configured to initiate a display reconfiguration within the aircraft cockpit, so that the information initially configured to be displayed by the defective graphical calculation chain of the avionics display equipment 12 is displayed by other avionics display equipment, such as the avionics equipment 14. This reconfiguration is identical to the one classically implemented in case of screen failure.

In addition, the monitoring device 30 is able to store the event that led to a defective module or tool sanction in a local non-volatile memory, not shown, so as to facilitate maintenance corresponding to simply removing and replacing the defective module, tool or even physical equipment.

According to one aspect, not shown, the monitoring device 30 uses simple electronics as detailed below in relation to FIGS. 2 and 3, executed if necessary by means of a low-capacity microprocessor, not shown, and, to provide more independence, capable of being dissimilar to that of the graphical calculation and display chain formed by the above modules 16, 18, 20, 22, 24, 26 of the avionics display equipment 12.

According to the present invention, as illustrated by FIG. 1, in order to avoid a common input/output (IO) mode as well as redundancy locally in calculating these inputs/outputs, which would imply complexity and a significant cost for each avionic display equipment, in particular in terms of electronic redundancy, protection against lightning or electromagnetic interference (EMI), connectors, etc., the inputs/outputs acquired and validated by other avionics equipment such as the avionics display equipment 14 in FIG. 1 are able to be retransmitted along arrow 36 via the acquisition module 16 to the electronic monitoring device 30 of the avionics display equipment 12.

According to one aspect not shown, for a system architecture commonly referred to as SMART, each screen is able to retransmit the acquired and validated inputs/outputs within the graphical calculation and display chain associated with it, whereas, for a system architecture commonly referred to as DUMB, it is the graphical calculators (formed by the above modules 16, 18, 20, 22, 24) that are is able to retransmit the acquired and validated inputs/outputs in order to consolidate the inputs/outputs acquired from a distinct equipment.

According to a one aspect of the present invention, in order to avoid any common failure mode associated with the transfer through the network and the acquisition resource 16, which is common with the direct graphical calculation and display chain of the avionics display equipment 12, the critical parameters are encapsulated by the other avionics equipment 14 with a cyclic redundancy check [CRC]. The critical input/output data encapsulated in this manner is transmitted along arrow 37, for example, through the graphical calculator (formed by the above modules 16, 18, 20, 22, 24) of the avionics display equipment 14 to the electronic monitoring device 30 of the avionics display equipment 12 via its acquisition module 16.

Figure 2:
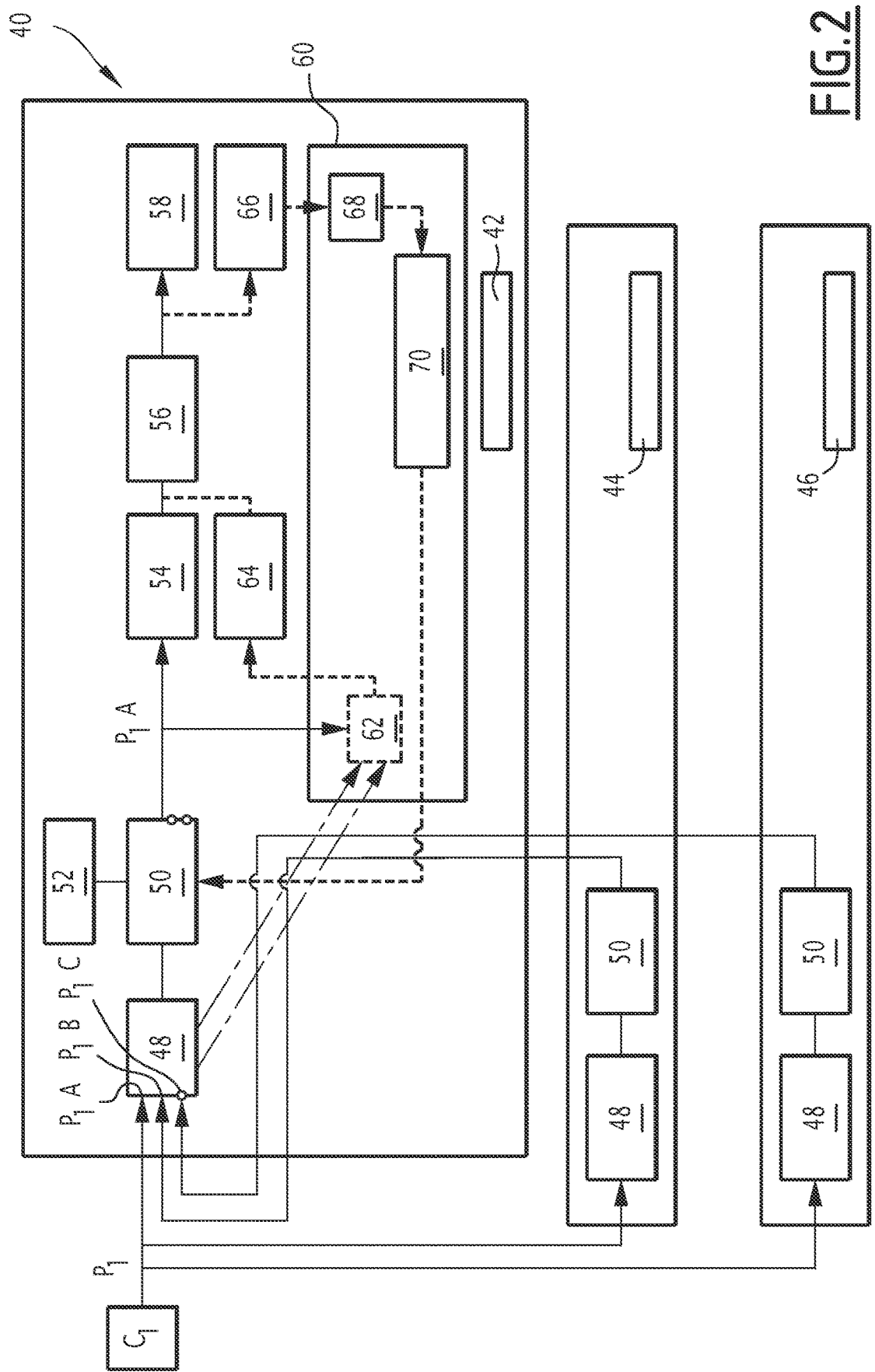
FIG. 2 is a schematic representation of a variant system architecture according to the present invention.

FIG. 2 is a schematic representation of a variant system architecture according to the present invention. More precisely, FIG. 2 illustrates the internal structure of a first graphical calculation and display chain 40 integrated within an avionics display equipment 42 according to the present invention.

In FIG. 2, two other graphical calculation and display chains are also partially shown, integrated within avionics display equipment 44 and avionics display equipment 46 respectively, each distinct from the avionics display equipment 42 according to the present invention.

Each of the three graphical calculation and display chains includes an acquisition module 48 configured to acquire a plurality of input/output parameters and a processing module 50 as an output, configured to determine input/output data from the acquired parameters.

As illustrated by FIG. 2, the first graphical calculation and display chain 40 further comprises a memory space 52 connected to the processing module 50, and, classically at the output of this processing module 50, a first calculation tool 54 within the calculation module 22 of FIG. 1, not shown in FIG. 2, with this first calculation tool 54 configured to determine at least one list of graphical commands for each parameter of said plurality, able to generate an associated symbology to be represented, then a graphical module 56, configured to generate an image comprising the symbology associated with each parameter from said at least one list of graphical commands respectively associated with each parameter of said plurality, and finally a display module, comprising a screen whose useful area 58 is configured to display said image comprising the associated symbology.

Furthermore, as previously indicated in connection with FIG. 1, according to the present invention, the first graphical calculation and display chain 40 further comprises an electronic monitoring device 60.

According to one particular aspect of the invention, the electronic monitoring device 60 comprises a voter 62 that can be activated in particular when at least two other graphical calculation and display chains, distinct from the first graphical calculation and display chain 40, transmit values of a same parameter, by encapsulation, also received directly by the first graphical calculation and display chain 40.

Indeed, as illustrated by FIG. 2, the same input/output parameter $P_1$ is transmitted directly, by a sensor not shown, for example, to the acquisition module 48 of the first graphical calculation and display chain 40 in the form $P_1A$, as well as at the input of the other two graphical calculation and display chains integrated within the respective avionics display equipment, 44 and 46.

According to the present invention, the processing module 50 of each of the two other graphical calculation and display chains integrated within the respective avionics display equipment, 44 and 46, is configured to encapsulate a value $P_1B$ for the graphical calculation and display chain integrated within the avionics display equipment 44, and a respective value $P_1C$ for the graphical calculation and display chain integrated within the avionics display equipment 46, within a CRC, and to transmit the corresponding CRC to the acquisition module 48 of the first graphical calculation and display chain 40, which retransmits these three values $P_1A$, $P_1B$ and $P_1C$ to the voter 62.

This voter 62 of the electronic monitoring device 60 is then able to verify the current and dynamic value of the parameter $P_1A$ received directly, by vote.

The voter makes it possible to know if the direct acquisition of the parameter is $P_1A$ correct and if the value is equivalent to other independent sources by comparing two by two, i.e. $P_1A$ with $P_1B$, $P_1A$ with $P_1C$, $P_1B$ with $P_1C$, and comparing the difference obtained in each two-by-two comparison to the same tolerance threshold.

The parameter, from among $P_1A$, $P_1B$ and $P_1C$, that is incorrect and different from the other two at the acceptable tolerance threshold is thus determined, which makes it possible to precisely locate any possible failure.

In other words, the local acquisition chain 40 of the avionics display equipment 42 receives the parameter $P_1A$ at a first instant $t_0$ from a sensor, not shown in FIG. 2, then the same parameter P1, externally and encapsulated within a CRC, from the same sensor, in the form $P_1B$ at time $t_1$ transmitted by the processing module 50 of the acquisition chain integrated within the avionics display equipment 44, and the same parameter $P_1$, from the same sensor, in the form $P_1C$ at time $t_2$ transmitted by the processing module 50 of the acquisition chain integrated within the avionics display equipment 46. It should be noted that the instants $t_0$, $t_1$, $t_2$ are low-latency constrained (i.e. lower than a predetermined latency threshold) according to the present invention, which makes it possible to reduce the network exchange constraints, or the parameters $P_1A$, $P_1B$ and $P_1C$ are dated, in a variant, which makes it possible to then identify them.

If the difference between $P_1A$ and $P_1B$ or between $P_1A$ and $P_1C$ is greater than the predetermined tolerance threshold while the difference between the external values $P_1B$ and $P_1C$ remains less than this same tolerance threshold, then the voter 62 detects and finds that there is a failure source within the acquisition modules 48 and processing modules 50 of the local acquisition chain 40 of the avionics display equipment 42, and, as a result, the electronic monitoring device 60 issues a sanction.

In other words, the two-by-two comparison implemented by the voter 62 leads to having a valid vote value at its output, making it possible to identify which of the parameters $P_1A$, $P_1B$ and $P_1C$ is not within the tolerance (note here that the case of double failure is not considered).

If the voter 62 outputs a coherent value from the direct graphical calculation and display chain 40 integrated within the avionic display equipment 42, then the electronic monitoring device 60 is configured to activate a second calculation tool 64 within the calculation module 22 of FIG. 1, not shown in FIG. 2, this second calculation tool 64 able to duplicate the graphical commands list associated with the parameter $P_1$ determined by the first calculation tool 54 and inserting it within this second calculation tool 64 of the calculation module 22.

In the contrary case (i.e. incoherent output of the voter 62) a sanction is generated to restart and/or stop the graphical calculation and display chain 40 integrated within a avionics display equipment 42 as indicated previously, which does not require any pilot intervention and which results in the momentary or permanent loss of the primary graphical calculation chain 40 for a single display channel, namely that of the avionics display equipment 42.

Thus according to the present invention, where it is possible to have three distinct acquisition chains at the system level, namely those of the avionics display equipment 42, 44 and 46, a voting principle is proposed, which has the advantage of identifying the invalid source and of permanently having a valid parameter value (always considering that there can be only one simultaneous failure). In this case, the availability is improved.

According to the present invention, the electronic monitoring device 60 ensures the integration of the set of critical parameters received from the independent calculation units (i.e. from each graphical calculation and display chain of the respective equipment, 42, 44 and 46) by comparison of the encapsulation CRC and the result of the vote with at least three available sources, one of which is local (i.e. here, that of the graphical calculation and display chain 40 integrated within the avionics display equipment 42) and two others resulting from the external calculators (the graphical calculation and display chains integrated within the avionics display equipment 44 and 46).

When it is impossible to have three distinct graphical calculation and display chains, it will not be possible to localize the fault and, in this case, according to the present invention, a notable difference (i.e. In this case, according to the present invention, a significant difference (i.e. a difference greater than predetermined threshold values) between the input/output parameters acquired locally on the one hand and those received from at least one independent external chain makes it possible to remove an error, resulting in a clear indication of the risk of error for these parameters (avoidance of an undetected error) or inhibition of the parameter considered in the event of a difference between the two distinct sources.

As detailed below in relation to FIG. 3, according to one particular aspect, the electronic monitoring device 60 that activated the second calculator tool 64, in the presence of a verified $P_1A$ value, via the voter 62, if necessary, is optionally able to modify the $P_1A$ value in order to generate a known approximate reference value closest to $P_1A$ belonging to said parameter database, with a threshold compatible with the flight safety objectives and to transmit this value in order to generate an associated micropattern (or microimage), by execution of the list of graphical commands associated with the parameter $P_1$ by the graphical module 56.

Indeed, in a classical way, each parameter has a representative image (i.e. symbology) for the pilot's attention. From this representative image (i.e. symbology), the present invention proposes generating a micropattern via the second calculator tool 64 and then the graphical module 56, corresponding to a simplified representative reference image of a critical parameter. According to the present invention, this micropattern is reintroduced into the graphical calculation and display chain 40 in order to ensure that it is capable of correctly processing each input/output parameter until its representation in the screen memory (set of pixels).

According to the present invention, the generation by the first calculator tool 54 and second calculator tool 64 and the graphical execution of the list of graphical commands specific to each respective calculator tool, 54 and 64, by the graphical module 56 is considered deterministic, leading to the same result even if executed a few milliseconds after each other.

In particular, the list of graphical commands generated by the calculator 64 and executed by the graphical module 56 is able to produce an associated micropattern in a screen area 66 not visible to the pilot but forming part of the display resource.

If the micropatterns are correctly traced to the image memory of the graphical module 56, then the operational image suitable for display in the useful area 58 of the screen of the graphical calculation and display chain 40 cannot comprise an image that is both coherent and ambiguous, potentially misleading a pilot, corresponding to displaying one or more coherent parameters offset by a plausible value not immediately detectable by the pilots (a drift in parameter, moderate difference, etc.) or to an image that would remain frozen for several hundred milliseconds but not show any deterioration.

It should be noted that a barely perceptible transient error (of a few hundred milliseconds) having no consequence on the pilot's task cannot mislead, nor can an error propagated at several places in the symbology, making the image incoherent and detectable by the pilot (jump in altitude, speed, attitude, etc.), or an image that fades away (loss of screen control), or a jerky image that alternates several parameter values, a shift in visible symbology or even a truncated part.

According to one particular optional aspect, to ensure the determinism of the graphical generation implemented by the graphical module 56, the present invention proposes activating the micropatterns differently from one tracing cycle to the next, implemented by the graphical module 56 (i.e. activating the micropatterns at distinct instants from one graphical generation cycle to the next).

As noted above, the micropatterns are drawn by the graphical module 56 in a screen area 66 not visible to the pilot but forming part of the display resource and transmitted to a module 68 of the electronic monitoring device 60. The module 68 is configured to generate an associated cyclic redundancy code [CRC] for each current micropattern displayed in the non-visible screen area 66, and to transmit it to the comparison module 70 (i.e. a hardware electronic comparator) configured to compare this CRC associated with the current micropattern, for the parameter value associated with the current micropattern, to a reference (i.e. expected) micropattern CRC previously stored in a dedicated memory space of the electronic monitoring device 60 and/or in an external database, accessible by the electronic monitoring device 60, with the dedicated memory space and/or the external database not shown.

The result of the comparison produced by the comparison module 70 is binary: the current and reference micropattern CRCs are either identical or different, and, in case of difference, the electronic monitoring device 60 is then configured to automatically sanction the said first graphical calculation and display chain 40 by implementing at least one suspension of execution for the parameter associated with the current micropattern CRC distinct from the reference micropattern CRC, or even a total stop, depending on the impact of this parameter on flight safety, as illustrated in dotted lines by the sanction arrow going from the comparison module 70 of the electronic monitoring device 60 to the processing module 50.

This comparison module 70, located in the electronic monitoring device 60, is thus configured to implement an independent comparison in relation to the graphical calculation and display chain 40 classically formed only by the above modules 48, 50, 54, 56 and 58.

As each parameter can take on an infinite number of values, the micropattern parameter according to the present invention is reduced to a known value that is close to and conforms to a predetermined acceptable tolerance for the pilot task associated with the parameter in question.

Beforehand, and in particular on the ground, without airworthiness constraints, in order to build the database or fill the dedicated memory space, each reference (i.e. expected) micropattern CRC, also called micropattern signature, is determined according to the predetermined acceptable tolerance thresholds as described below in relation to FIG. 3.

Figure 3:
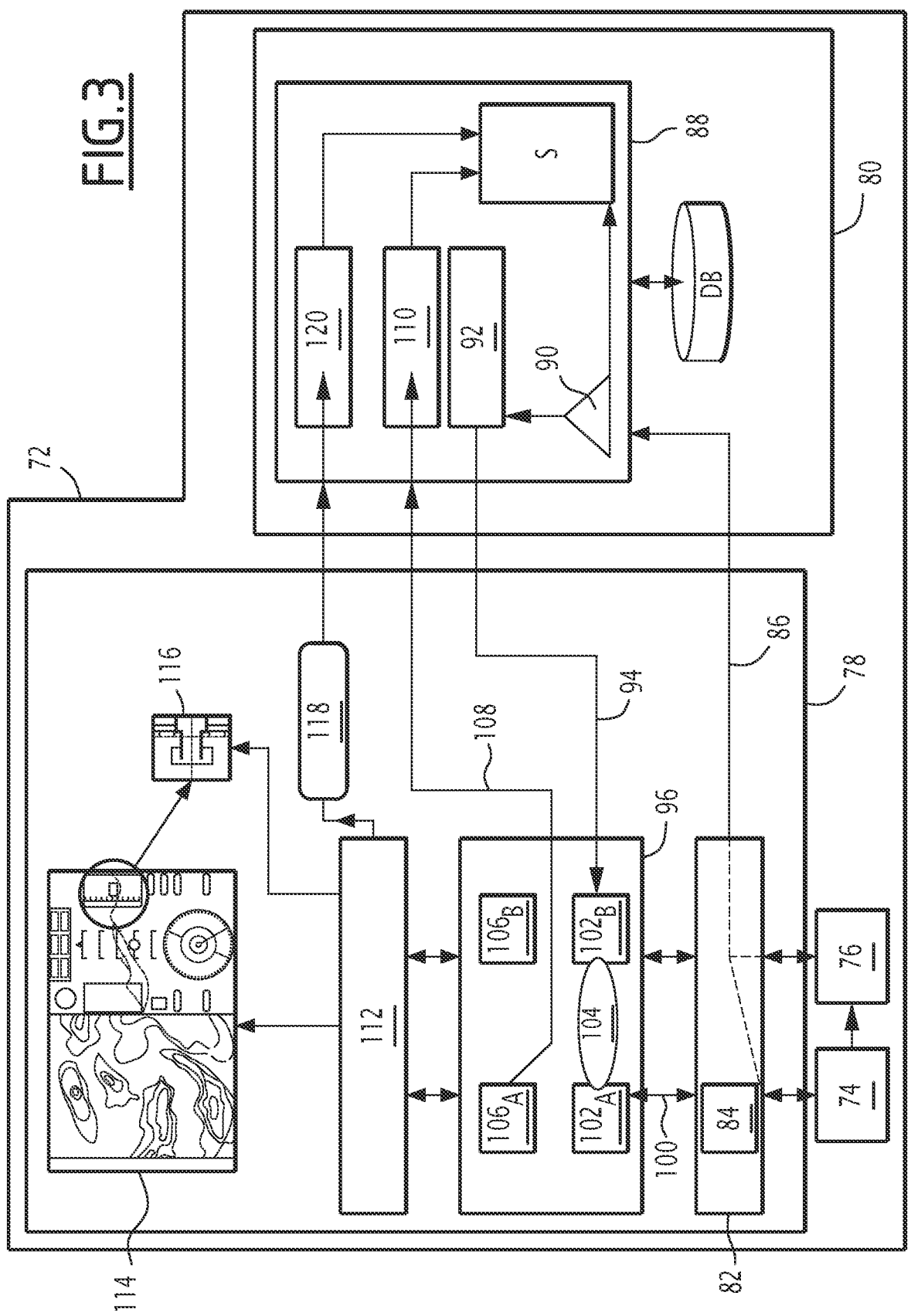
FIG. 3 is a schematic representation of an example application of the present invention.

FIG. 3 is a schematic representation of an example application of the present invention, namely altitude display.

In this Figure, an aircraft cockpit avionics system 72 is shown and includes a plurality 74 of critical parameter sensors in particular, and several distinct graphical calculation and display chains, namely at least the graphical calculation and display chain 76 and the graphical calculation and display chain 78, the operation of which is controlled (i.e., monitored) by a monitoring unit 80.

In this example application, one of the plurality of sensors 74 directly provides an altitude of 1043 feet to the acquisition module 82 of the graphical and display calculation chain 78 at an instant $t_0$. According to one optional aspect, the acquisition module 82 uses a filtering tool to transform this value from 1043 feet to 1040 feet, for example.

The other graphical calculation and display chain 76 provides an altitude of 1056 feet at an instant $t_1$, with this altitude value encapsulated by CRC.

According to the present invention, the two values, 1040 feet (supplied directly) and 1056 feet (supplied indirectly by the graphical calculation and display chain 76) are transmitted according to the present invention by the acquisition module 82, via the arrow 86, to the monitoring device 88 and in particular to a first comparator 90, which compares the 16-foot difference between these two values to a first predetermined value threshold of said parameter.

According to the example of FIG. 3, this 16-foot difference remains acceptable but, if not, the monitoring device 88 is configured to automatically generate a sanction S of the first graphical calculation and display chain 78 by implementing at least one suspension of its execution.

As the 16-foot difference remains acceptable, the first comparator 90 optionally activates a module 92 for determining an approximate reference value, configured to bring the current and dynamic value of each parameter to said approximate reference value in terms of said altitude-specific tolerance threshold and then provides a value of 1050 feet to a calculation module 96 according to arrow 94 (with said approximate reference value known and stored in the database).

In parallel, according to an arrow 100, the acquisition module 82 directly and classically provides the current altitude value of 1040 feet, after filtering obtained from the value provided directly by the altitude sensor of the plurality 74 of critical parameter sensors.

The calculation module 96 includes two tools 102$_A$ and 102$_B$ for making a calculation 104 (i.e. a calculation code) associated with the altitude parameter and duplicated between these two calculation tools 102$_A$ and 102$_B$.

In other words, the two tools 102$_A$ and 102$_B$ are configured to apply substantially the same list of graphical commands associated with the same altitude parameter, with the difference that tool 102$_A$ corresponds to the classic calculation tool of the graphical calculation and display chain 78 and is able to completely generate the image to be displayed to the pilot in a useful display area according to a 20 Hz calculation cycle, while the tool 102$_B$ corresponds to a calculation tool activated by the monitoring device 88 to generate only the altitude micropattern according to a 1 Hz calculation cycle, for example.

The tool 102$_A$ thus receives the 1040 feet altitude value as input while the tool 102$_B$ receives the 1050 feet altitude value as an input.

Within the calculation module 96, the outputs of the calculator tools 102$_A$ and 102$_B$ are connected to respective graphics stack generation tools, 106$_A$ and 106$_B$.

In particular, as illustrated in FIG. 3, the graphics stack generation tool 106$_A$ of the calculation module 96 is able to transmit the said determined parameter value for display (i.e. able to be transmitted for display to the graphical module 112) to a second comparator 110 of the monitoring device 88, along the arrow 108.

The second comparator 110 is able to compare this value, before display, with that received directly by the acquisition module 82 of the graphical calculation chain 78, and, in the event of a difference greater than a second predetermined value threshold of the said altitude parameter, to automatically sanction the graphical calculation and display chain 78, by generation of a sanction S, implementing at least one suspension of its execution.

In other words, once the calculations have been carried out by the calculation module 96 and before constituting the graphical view via the graphical module 112, the parameter value must be returned to the monitoring device 88, to ensure that the difference between the value transmitted to the micropattern (i.e. 1050 feet) and that of the display (i.e. 1040 feet) are consistent and within the acceptable tolerance for this parameter type. Thus, according to the present invention, an algorithm for extracting the parameter on the basis of the graphics stack is able to be implemented.

In the event of a difference greater than the second predetermined value threshold of said altitude parameter, the monitoring mechanism implemented by the monitoring device 88, manipulating non-similar data and the result transmitted to the monitoring device 88, is considered as unable to compensate consistently for the primary display chain formed by the elements 82, 102$_A$, 106$_A$, 112 and generating the overall image 114, and the micropattern generating graphical chain formed by the elements 82, 102$_B$, 106$_B$, 112 and generating the micropattern 116 able to be displayed in a non-visible screen area but belonging to the display resource.

According to the present invention, the graphical module 112 is also configured to transmit the micropattern 116 to an obtaining module 118, configured to obtain a cyclic redundancy code CRC associated with the micropattern and transmit this current micropattern CRC to a third comparator 120 of the monitoring device 88 able to compare this current micropattern CRC to a reference micropattern CRC stored and accessible from the database DB by the monitoring device 88.

Each reference micropattern CRC is associated in the database DB to an altitude value. For the example in FIG. 3 where the current micropattern CRC is associated with the altitude value of 1050 feet, the reference micropattern CRC associated with that same value of 1050 feet is retrieved from the database DB.

In other words, to extract a reference micropattern CRC, the original value of 1040 feet reduced to an approximate reference value of 1050 feet is used, corresponding to an average comparison threshold value corresponding to the acceptable tolerance to guarantee flight safety.

With this approximate reference value of 1050 feet (determined in particular by the module 92 for determining an approximate reference value, as indicated above, after validation by means of the first comparator 90 mentioned above, which is able to consolidate the current and dynamic value of the parameter received directly by the acquisition module 82 of the chain 78 by using the values encapsulated via CRC transmitted by other chains distinct and independent of the chain 78) and therefore slightly different and within the acceptable range of pilot error, used to extract the reference micro-pattern CRC, it can therefore be ensured that if the current micropattern CRC is correct at the display output while being identical to the reference micropattern CRC, the complete execution chain 78 (formed of modules 82, 96 and 112) has integrity.

According to another example, if the altitude received is 960 feet, with a tolerance threshold at this altitude set at 50 feet, the reference micropattern CRC associated with the 950 feet value is extracted, the closest reference value to 960 feet in relation to the next value associated with a reference micropattern CRC saved in the database DB, namely the 1000 feet value spaced from the 950 feet value by the size of the tolerance threshold, i.e. 50 feet.

This principle of associating each approximate reference value, spaced from the tolerance threshold relevant to the parameter type and to value range considered with a reference micropattern CRC, makes it possible to limit the number of reference micropattern CRC configurations to be saved in the database DB.

For example and subject to validation at the flight safety level, in order to quantify the memory space required for storage of the micropattern CRCs corresponding to each parameter and for each tolerance value, the roll angle used, for example, is a range of −90° to +90°, with a tolerance threshold of 2° (i.e. a step, a spacing between angular values of) 2°, which amounts to storing 90 CRC values of micropatterns associated with the display of the roll angle parameter, for the heading: a range of 360° is used, with a tolerance threshold of 2°, which amounts to storing 180 CRC values of micropatterns associated with the display of the heading parameter, etc. for all relevant parameter values to be shown within a cockpit, which corresponds in particular to a storage memory space within the database DB of the order of 20 kb (kilobyte), a memory space generated in particular beforehand on the ground on a test bench by injecting each value of parameter ranges spaced from the predefined tolerance threshold into an integrated graphical reference calculation chain, in order to recover the associated reference micropattern CRC. The generation of this memory space can be automated in order to be able to manage the micropattern development according to the representation required for the associated aircraft.

Thus, the current micropattern 116 follows the same graphical execution chain 78 as the operational image 114 and represents the same calculations to cover the calculation and graphical part. Injecting the current micropattern 116 with a dynamic input representing the input/output of the primary graphical execution chain 78 ensures that the data is not frozen and provides assurance that the processing chain is indeed performing the algorithms with different values depending on the flight parameters (i.e. the real-time context).

In the example of FIG. 3, the electronic monitoring device 88 includes an information processing unit not shown formed by a memory and a processor, associated with the memory, for example, both not shown.

In the example of FIG. 3, the first comparator 90, the module 92 for determining an approximate reference value, the second comparator 110, and the third comparator 120 and the sanction generator S are each made as software or software brick, executable by the processor of the electronic monitoring device 88. The memory of the electronic monitoring device 88 is then able to store software corresponding to each of these elements 90, 92, 110, 120 and the sanction generator. The processor of the electronic monitoring device 88 is then adapted to execute each such software.

In a variant embodiment not shown, the first comparator 90, the module 92 for determining an approximate reference value, the second comparator 110, and the third comparator 120 and the sanction generator S are each implemented as a programmable logic component such as a field programmable gate array (FPGA), or as a dedicated integrated circuit such as an application specific integrated circuit (ASIC).

When the electronic monitoring device 88 is implemented as one or more software programs, i.e. as a computer program, it is further adapted to be recorded on a computer-readable medium, not shown. The computer-readable medium is a medium adapted to store electronic instructions and be coupled to a computer system bus, for example. For example, the readable medium is a ROM or RAM memory, any type of non-volatile memory such as EPROM, EEPROM, FLASH, NVRAM, etc. A computer program comprising software instructions is then stored on the readable medium.

According to the present invention, it should be noted that the calculations implemented within the tools $102_A$ and $104_A$ associated with generation of the operational image 114 are not executed in the same memory partition as those implemented within the tools $102_A$ and $104_A$ associated with generation of the micropatterns 116 of each parameter, and thus use different memory areas of the same component or block of components constituting the random access memory (RAM) of the calculation module 96. A memory test micropattern mechanism is also integrated into this partition in order to verify its integrity.

In terms of real time, each operational image 114 comprising one or more critical parameters, the respective micropattern(s) associated with each parameter are executed one after the other at each graphical generation cycle, allowing coverage of all parameters in a time compatible with the security objectives (from one to several seconds, depending on the criticality).

Moreover, according to the present invention, because the calculation is carried out locally, the latency is low, of the order of one CPU cycle, which does not require the parameters to be recalibrated by a stack principle and makes it possible to reduce network exchange constraints. The tolerance threshold can thus be reduced to the minimum, which is much more efficient than state of the art feedback systems based on several units that exchange data asynchronously.

Figure 4:
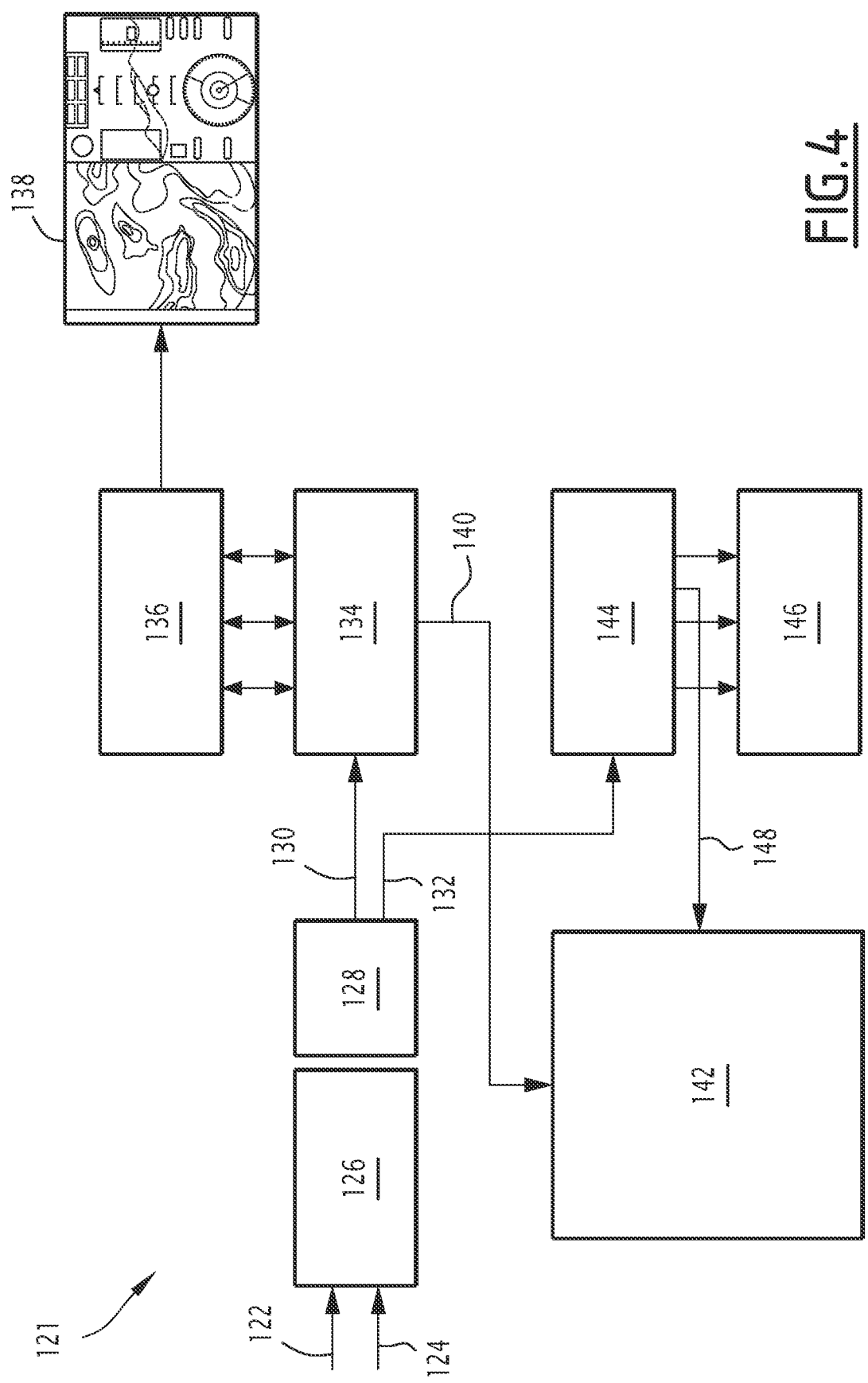
FIG. 4 is a schematic representation of a switch mode power supply module of an avionics device according to the present invention.

FIG. 4 is a schematic representation of a switching power supply module 121 of the avionics equipment according to the present invention. Indeed, when the primary chain 78 and the monitoring unit 80 are integrated within the same equipment 72, as previously illustrated by FIG. 3, according to the present invention, taking precautions at the power supply level is also proposed, so as not to create a common failure mode.

According to the present invention, a single power supply, shown by two supply voltages 122 and 124 of 28 DC volts (Vcc), for example, is sufficient at the primary level 126 but setting up a separate distribution 130 and 132 at the secondary level 128 is proposed, preferably of a different value.

The 28 volt DC (Vcc) dedicated supply voltage 130, for example, feeds the primary direct chain 13 generating the operational image 138 via a primary buck converter or series chopper 134, with the primary buck 134 able to transmit feedback 140 to a monitoring module 142 specific to the supply able to detect any common mode failure, i.e. at a low or high voltage, due to noise, disturbance, micro-cuts, etc., and able to stop the low or high voltage supply, and able to stop the power supply in case of detection of an effective failure.

According to the present invention, the dedicated power supply voltage 132, such as 3.3 volts DC (Vcc), feeds the monitoring device 146 via a secondary buck converter or series chopper 144, independent of the primary buck 134, having in particular a criticality level in accordance with DAL A criticality level, the secondary buck 144 also being able to transmit feedback 148 to the above power supply-specific monitoring module 142.

This power supply thus prevents any operation of the electronic components of the primary chain 136 or of the monitoring device 146 outside their field of use.

Thus, according to the present invention, avionics equipment such as the avionics equipment 72 of FIG. 3 comprises in particular the above electronic monitoring device but also optionally a switching power supply module, with at least the secondary circuit configured to provide an independent segregated power supply and/or configured to provide a supply voltage of a distinct value between said first graphical calculation chain and said monitoring device, and comprising a monitoring element of said segregated power and/or voltage configured to suspend said power in the event of a difference between a current and an expected power previously stored within said monitoring element of said power module.

Figure 5:
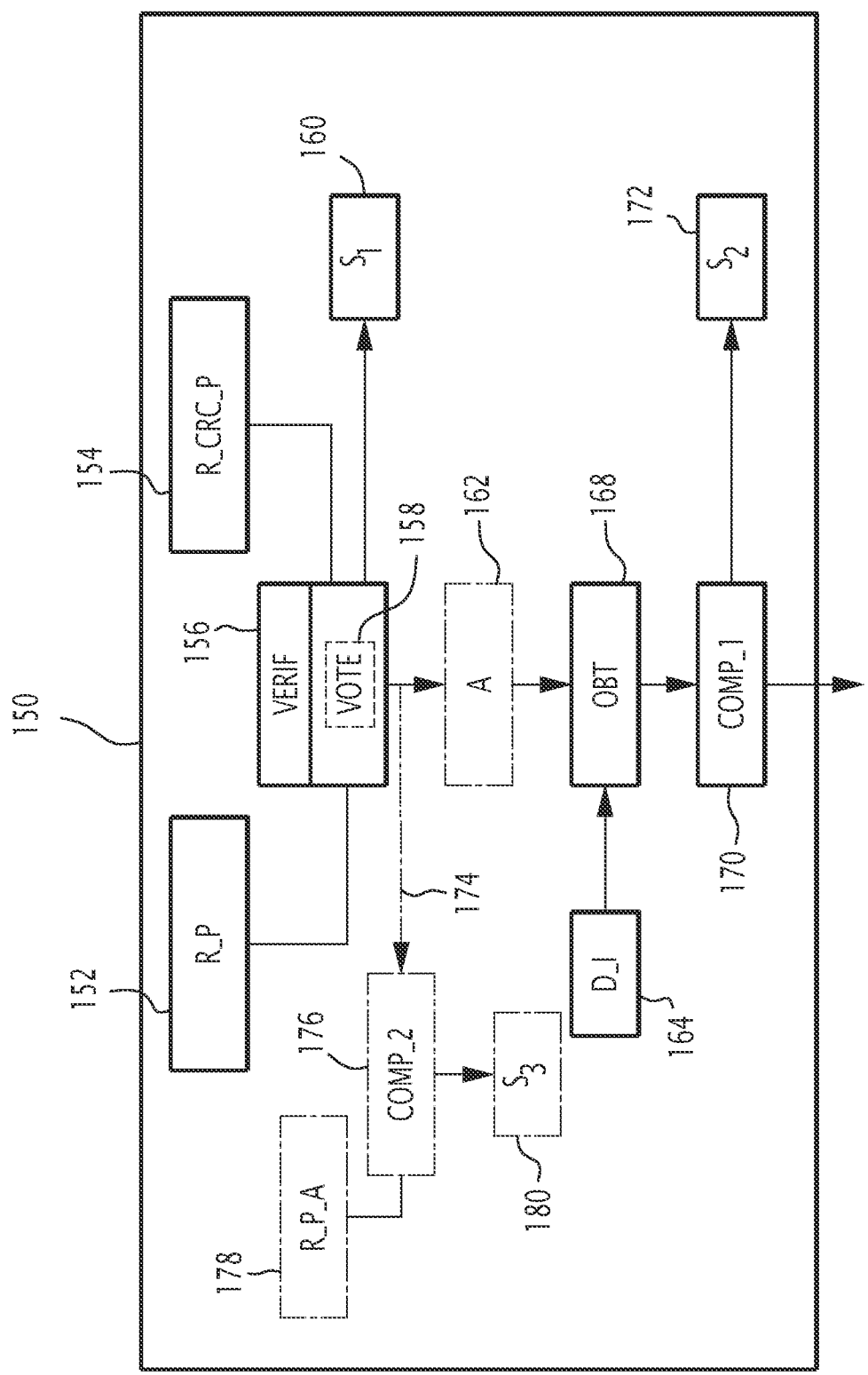
FIG. 5 is a flowchart of a method for monitoring the execution of a first graphical calculation and display chain according to the present invention.

The operation of the electronic monitoring device 88 will now be explained with reference to FIG. 5, showing a flowchart of the method 150 for executing a first graphical calculation and display chain associated with a first aircraft cockpit display screen.

According to a first step 152, the electronic monitoring device 88 within the first comparator 90 implements the reception R_P of the current and dynamic value of said at least one input/output parameter received by the acquisition module 82 of said first graphical calculation chain 78, for at least one parameter of a plurality of input/output parameters of said first graphical calculation chain, directly from a sensor belonging to a plurality of sensors of said aircraft.

According to a second complementary and optional step 154, the electronic monitoring device 88 within the first comparator 90 implements the reception R_CRC_P of at least one cyclic redundancy code encapsulating a value of said parameter, received, then transmitted to said electronic monitoring device by said acquisition module 82 of said first graphical calculation and display chain, coming from a graphical calculation and display chain 76 associated with a display screen of said aircraft cockpit distinct from said first display screen.

According to a third complementary and optional step 156, the electronic monitoring device 88 within the first comparator 90 implements the verification of said current and dynamic value of said parameter by determining the difference between:

the current and dynamic value of said parameter received by the acquisition module of said first graphical calculation chain, directly from a sensor belonging to a plurality of sensors of said aircraft, and at least one associated value of said parameter, determined respectively from said at least one cyclic redundancy code encapsulating a value of said parameter.

In particular, the verification step 156 implements an optional voting step 158, via the voter 62 of FIG. 2, when at least two cyclic redundancy codes encapsulating a value of the same parameter are received substantially simultaneously from at least two distinct graphical and display calculation chains respectively associated with at least two distinct display screens of said aircraft cockpit and distinct from said first display screen.

At the end of the verification step 156, in the event of a difference greater than a first predetermined threshold of value of said parameter resulting from said difference determination, via the voter 62 of FIG. 2, if necessary, the electronic monitoring device (60 of FIG. 2 or 88 of FIG. 3) implements a first step 160 of automatic sanction S1 of said first graphical calculation and display chain by implementing at least one suspension of its execution.

In the absence of this difference, the electronic monitoring device 88 of FIG. 3 optionally implements a step 162, via the module 92, of determining an approximate reference value of the current and dynamic value of said at least one parameter in accordance with said tolerance threshold specific to said at least one parameter.

In step 164, the electronic monitoring device 88 implements the duplication and insertion of at least one graphical command list associated with said parameter within the calculation module 96 of the primary graphical calculation and display chain.

In step 168, from said approximate reference value as previously indicated, the electronic monitoring device 88 of FIG. 3 implements the obtaining a current cyclic redundancy code associated with a current micropattern generated by execution of said at least one duplicated graphical command list associated with said parameter, in particular from the module 118 of FIG. 3.

In step 170, the electronic monitoring device 88 of FIG. 3 implements a comparison of said current cyclic redundancy code associated with the current micropattern with a reference cyclic redundancy code associated with a reference micropattern obtained and previously stored in a dedicated memory space DB within or accessible by said electronic monitoring device 88 of FIG. 3.

In step 172, in the event of a cyclic redundancy code value difference between said current cyclic redundancy code associated with a current micropattern and said reference cyclic redundancy code associated with a reference micropattern, the electronic monitoring device 88 of FIG. 3 implements an automatic sanction $S_2$ of said first graphical calculation and display chain 78 of FIG. 3 by implementing at least one suspension of its execution.

Optionally, the method further comprises the transmission 174 of the verification result 156 to the optional comparator 110 for a step 176 of comparing this result to the value R_P_A of said parameter, determined for display by the calculation module of said first graphical calculator chain from the current and dynamic value of said parameter, received by the acquisition module of said first graphical calculator chain, this value R_P_A of said parameter determined for display being previously received by the optional comparator 110 during a step 178.

During step 176, the optional comparator 110 compares the value R_P_A of said parameter determined for display and the current and dynamic value of said parameter, received by the acquisition module of said first graphical calculation chain, directly from a sensor belonging to a plurality of sensors of said aircraft.

In the event of a difference greater than a second predetermined threshold value of said parameter resulting from the comparison 176, during a step 180, the electronic monitoring device 88 implements an automatic sanction $S_3$ of said first graphical calculation and display chain by implementing at least one suspension of its execution.

The person skilled in the art will understand that the invention is not limited to the embodiments described, nor to the particular examples of the description, with the above-mentioned embodiments and variants able to be combined with each other to generate new embodiments of the invention.

Thus, the present invention makes it possible to implement local monitoring of a complete calculation and graphical chain in the avionics display equipment based on the partial execution of the display application for generic critical parameters without requiring a second complete calculation and graphical chain, which limits the monitoring and development costs of the solution while making it possible to integrate it into the graphical calculators associated with the avionics visualizations of future aircraft instrument panels, in particular with an unseparated cockpit, whether airplane or helicopter, but also in smaller aircraft (e.g. such as flying taxis) which cannot install complex and redundant systems.

Furthermore, the present invention makes it possible to limit pilot verifications on a non-localized detection of error in the visualization cockpit systems and also to reduce false alarms associated with latency due to asynchronisms, network and micro power cuts, communication cuts that can make the system inoperative, the need to inhibit monitoring if parameters evolve to quickly or inputs/outputs for monitoring are lacking, or due to a false indication of the primary graphical calculation and display chain being monitored, on what it displays to the monitoring device (rising inhibition because the monitoring device could believe that a non-critical format is being displayed).

Consequently, operations in compromised cases are simplified and the pilot's workload and training are reduced and facilitated.

Moreover, the present invention is modular and reconfigurable so as to reduce the number of parameters to be monitored strictly to local display requirements, and thus to free calculation resources, or, on the contrary, to increase the number of critical parameters to be monitored and ensure display integrity by limiting the probability of displaying an error, so that it remains lower than 10-7, or even 10-9, by locating and automatically sanctioning the erroneous source without pilot intervention, and by reconfiguring the display so that any critical parameter is permanently displayed and visible to the crew.

In addition, maintenance is facilitated and reduced to a simple removal of the equipment, module or tool at the source of the error by avoiding unconfirmed removal of failures associated with communication buses inducing malfunctions or robustness problems, the rate of which can reach 10 to 20% of failures, depending on the complexity of the system. The present invention thus makes it possible to reduce the No Fault Found (NFF) removal rate and the associated maintenance cost.

The invention claimed is:

1. A method for monitoring the execution of a first graphical calculation and display chain associated with a first aircraft cockpit display screen, the aircraft cockpit comprising a plurality of distinct display screens, each associated with a graphical calculation and display chain, each graphical calculation and display chain comprising at least:
   an acquisition module configured to acquire and calculate a plurality of input/output parameters of said first graphical calculation chain,
   a calculation module configured to determine at least one list of graphical commands able to generate an associated symbology to be represented, for each parameter of said plurality,
   a graphical module configured to generate an image comprising the symbology associated with each parameter, from said at least one list of graphical commands respectively associated with each said plurality parameter,
   a display module configured to display said image comprising the symbology associated with each parameter, on the display screen associated with said graphical calculation and display chain,
   the method being implemented by an electronic monitoring device associated locally with said first graphical calculation and display chain, the method comprising the following steps, for at least one parameter of said plurality:
   duplicating and inserting said at least one list of graphical commands associated with said parameter within said calculation module,
   from a current and dynamic value of said parameter, obtaining a current cyclic redundancy code associated with a current micropattern generated by executing said at least one duplicated list of graphical commands associated with said parameter,
   comparing said current cyclic redundancy code associated with the current micropattern with a reference cyclic redundancy code associated with a reference micropattern obtained and stored beforehand in a dedicated memory space within the said electronic monitoring device, for a substantially identical value of the said parameter, to within a tolerance threshold specific to the said parameter,
   in the event of a difference in the cyclic redundancy code value, between the said current cyclic redundancy code associated with a current micropattern and the said reference cyclic redundancy code associated with a reference micropattern, automatic sanctioning of the said first graphical calculation and display chain by implementing at least one suspension of its execution.

2. The method according to claim 1, wherein said current micropattern is configured to be displayed in an area of the first screen not visible to a pilot of said aircraft.

3. The method according to claim 1, further comprising, beforehand, for said at least one parameter of said plurality:
   receiving the current and dynamic value of said parameter, received directly from a sensor belonging to a plurality of sensors of said aircraft, by the acquisition module of said first graphical calculation chain,
   receiving at least one cyclic redundancy code, encapsulating a value of the said parameter, received and then transmitted to the said electronic monitoring device by the said acquisition module of the said first graphical calculation and display chain, coming from a graphical calculation and display chain associated with a display screen of the said aircraft cockpit distinct from the said first display screen, and
   verifying said current and dynamic parameter value by determining the difference between:
   the current and dynamic value of said parameter received directly from a sensor belonging to a plurality of sensors of said aircraft by the acquisition module of said first graphical calculation chain, and
   at least one associated value of said parameter respectively determined from said at least one cyclic redundancy code encapsulating a value of said parameter;
   in the event of a difference greater than a first predetermined threshold value of said parameter resulting from said difference determination, automatic sanctioning of said first graphical calculation and display chain by implementing at least one suspension of its execution.

4. The method according to claim 3, in which the verification implements a vote when at least two cyclic redundancy codes encapsulating a value of a same parameter are received substantially simultaneously from at least two distinct graphical calculation and display chains respectively associated with at least two distinct display screens of said aircraft cockpit and distinct from said first display screen.

5. The method according to claim 3, further comprising:
   receiving the said parameter value determined for display by the calculation module of said first graphical calculation chain from the current and dynamic value of said parameter, received by the acquisition module of said first graphical calculation chain,
   comparing the said parameter value determined for display and the current and dynamic parameter value received by the acquisition module of the said first graphical calculation chain, coming directly from a sensor belonging to a plurality of sensors of the said aircraft, and, in the event of a difference greater than a second predetermined threshold value of the said parameter, automatic sanctioning of the said first graphical calculation and display chain by implementing at least one suspension of its execution.

6. The method according to claim 1, further comprising a step, prior to obtaining a current cyclic redundancy code associated with a current micropattern generated by execution of said at least one duplicated graphical command list associated with said at least one parameter, of determining an approximate reference value of the current and dynamic value of said at least one parameter based on said tolerance threshold specific to said at least one parameter.

7. A non-transitory computer-readable medium including a computer program having software instructions that implements a monitoring method according to claim 1 when executed by a computer.

8. An electronic device for monitoring the execution of a first graphical calculation and display chain associated with a first aircraft cockpit display screen, the aircraft cockpit comprising a plurality of distinct display screens, each associated with a graphical calculation and display chain, each graphical calculation and display chain comprising:

an acquisition module configured to acquire and calculate a plurality of input/output parameters of said first graphical calculator chain, a calculation module configured to determine at least one list of graphical commands able to generate an associated symbology to be represented, for each parameter of said plurality, a graphical module configured to generate an image comprising the symbology associated with each parameter from said at least one list of graphical commands respectively associated with each parameter of said plurality, a display module configured to display said image comprising the symbology associated with each parameter on the display screen associated with said graphical calculation and display chain, wherein the electronic monitoring device is locally associated with said first graphical calculation and display chain, and, for at least one parameter of said plurality, configured to:

duplicate and insert said at least one list of graphical commands associated with said parameter within said calculation module, from a current and dynamic value of said parameter, obtain a current cyclic redundancy code associated with a current micropattern generated by execution of said at least one duplicated list of graphical commands associated with said parameter, compare said current cyclic redundancy code associated with the current micropattern with a reference cyclic redundancy code associated with a reference micropattern obtained and stored beforehand in a dedicated memory space within said electronic monitoring device, for a substantially identical value of said parameter, to within a tolerance threshold specific to said parameter, in the event of a difference in cyclic redundancy code between said current cyclic redundancy code associated with a current micropattern and said reference cyclic redundancy code associated with a reference micropattern, automatically sanctioning said first graphical calculation and display chain by implementing at least one suspension of its execution.

9. An aircraft avionics equipment comprising:

a first graphical calculation and display chain associated with a first aircraft cockpit display screen, the aircraft cockpit comprising a plurality of distinct display screens, each associated with a graphical calculation and display chain, each graphical calculation and display chain comprising:

an acquisition module configured to acquire and calculate a plurality of input/output parameters of said first graphical calculation chain, a calculation module configured to determine at least one list of graphical commands able to generate an associated symbology to be represented, for each parameter of said plurality, a graphical module configured to generate an image comprising the symbology associated with each parameter from said at least one list of graphical commands respectively associated with each parameter of said plurality, a display module configured to display said image comprising the symbology associated with each parameter, on the display screen associated with said graphical and display calculation chain, and a device for monitoring the execution of said first graphical calculation and display chain according to claim 8, a switching power supply module, at least the secondary circuit of which is configured to provide an independent segregated power supply and/or to provide a supply voltage of distinct value between said first graphical calculation chain and said monitoring device, and comprising a monitoring element of said segregated power supply and/or voltage configured to suspend said power supply in case of difference between a current power supply and an expected power supply previously stored within said monitoring element of said power supply module.

10. An aircraft comprising one electronic monitoring device element according to claim 8 and avionics equipment according to claim 9.

* * * * *